US009951845B2

(12) United States Patent (10) Patent No.: US 9,951,845 B2
Hemphill et al. (45) Date of Patent: Apr. 24, 2018

(54) TRANSMISSION WITH DUAL INPUT AND GEAR RATIO MULTIPLICATION

(71) Applicant: Schaeffler Technologies AG & Co. KG, Herzogenaurach (DE)

(72) Inventors: Jeffrey Hemphill, Copley, OH (US); Edmund Maucher, Jeromesville, OH (US); David Smith, Wadsworth, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 286 days.

(21) Appl. No.: 14/725,117

(22) Filed: May 29, 2015

(65) Prior Publication Data

US 2015/0362044 A1 Dec. 17, 2015

Related U.S. Application Data

(60) Provisional application No. 62/013,280, filed on Jun. 17, 2014.

(51) Int. Cl.
*F16H 3/08* (2006.01)
*F16H 3/00* (2006.01)
*F16H 3/093* (2006.01)
*F16H 3/091* (2006.01)
*F16H 37/04* (2006.01)

(52) U.S. Cl.
CPC ............. *F16H 3/006* (2013.01); *F16H 3/093* (2013.01); *F16H 3/0915* (2013.01); *F16H 37/046* (2013.01); *F16H 2003/0826* (2013.01); *F16H 2200/0069* (2013.01); *F16H 2200/0086* (2013.01); *Y10T 74/19223* (2015.01)

(58) Field of Classification Search
CPC .................. F16H 37/021; F16H 2003/0931
USPC ................... 74/330, 331, 333, 340
See application file for complete search history.

(56) References Cited

U.S. PATENT DOCUMENTS

| 8,051,732 | B2  | 11/2011 | Gitt     |            |
|-----------|-----|---------|----------|------------|
| 8,342,048 | B2* | 1/2013  | Rieger   | F16H 3/006 |
|           |     |         |          | 74/330     |
| 8,365,626 | B2* | 2/2013  | Rieger   | F16H 3/006 |
|           |     |         |          | 74/330     |
| 8,393,239 | B2* | 3/2013  | Rieger   | F16H 3/006 |
|           |     |         |          | 74/330     |
| 8,528,432 | B2* | 9/2013  | Nakamura | F16H 3/006 |
|           |     |         |          | 74/330     |

(Continued)

Primary Examiner — Ha Dinh Ho
(74) Attorney, Agent, or Firm — Brooks Kushman P.C.

(57) ABSTRACT

A transmission including: a first number of input shafts; an output shaft; a second number of gears non-rotatably connected to the output shaft; a third number of lay shafts; and full synchronizer clutches. Each full synchronizer clutch includes: a respective first half synchronizer clutch arranged to non-rotatably connect a respective first gear to a respective lay shaft included in the third number of lay shafts, and disconnect the respective first gear from the respective lay shaft; and a respective second half synchronizer clutch arranged to non-rotatably connect a respective second gear to the respective lay shaft, and disconnect the respective second gear from the respective lay shaft. The transmission is arranged to provide a fourth number of total reverse and forward speed ratios equal to the first number multiplied by the second number multiplied by the third number.

7 Claims, 13 Drawing Sheets

(56) References Cited

U.S. PATENT DOCUMENTS 8,667,857 B2 * 3/2014 Brandenburg .......... F16H 61/16
 74/330
8,887,589 B2 * 11/2014 Ibamoto .................. F16H 3/08
 74/330

* cited by examiner

TRANSMISSION WITH DUAL INPUT AND GEAR RATIO MULTIPLICATION

CROSS-REFERENCE TO RELATED APPLICATIONS

This application claims the benefit under 35 U.S.C. § 119(e) of U.S. Provisional Patent Application No. 62/013,280, filed Jun. 17, 2014, which application is incorporated herein by reference in its entirety.

TECHNICAL FIELD

The present disclosure relates to a transmission with a dual input and gear ratio multiplication. In particular, the disclosure relates to a dual clutch or dual planetary gear configuration for the dual input and dual synchronizer clutches for connecting pairs of gears to a same lay shaft.

BACKGROUND

Known power shift transmissions use basic manual transmission architecture with a double clutch system as input. The drawback of such a system is that the system needs a relatively long axial installation space due to the double clutch system. The long axial installation space limits the number of gear ratios, especially in front wheel drive vehicles. Large number of gear ratios are desirable for good fuel economy. Further, known transmissions typically require a separate gear pair for each speed forward or backward speed ratio.

It is known to provide "gear multiplication" to a transmission by which the number of gears needed to provide a particular number of speed ratios is reduced. However, in order to implement the gear multiplication, "torque filling" is needed. Specifically, for shifts between certain speed ratios, for example from a third speed ratio to a fourth speed ratio, rather than switching between two separate lay shafts, the switch is made on the same lay shaft. Thus, to shift from the third speed ratio to the fourth speed ratio, the torque to the lay shaft must be interrupted. Without some intervention, a jolt or lurch occurs due to the torque interruption. To prevent the jolt or lurch, a speed ratio using a different lay clutch must be used during the torque interruption to provide torque to the transmission output. The need for torque filling increases cost and complexity of the transmission.

SUMMARY

According to aspects illustrated herein, there is provided a transmission, including: first and second input shafts; an output shaft; first, second, and third lay shafts; first and second gears non-rotatably connected to the first input shaft, and the first lay shaft, respectively; third and fourth gears meshed with the first and second gears, respectively so that rotation of the first and second gears causes rotation of the third and fourth gears, respectively; a first full synchronizer clutch including a first half synchronizer clutch arranged to non-rotatably connect the third gear to a second lay shaft and to disconnect the third gear from the second lay shaft and a second half synchronizer clutch arranged to non-rotatably connect the fourth gear to the second lay shaft and to disconnect the fourth gear from the second lay shaft; and a synchronizer engaged with the first full synchronizer. For a first speed ratio for the transmission, the synchronizer is arranged to non-rotatably connect the third and fourth gears to create a first torque path from the first input shaft to the second lay shaft.

According to aspects illustrated herein, there is provided a transmission for a motor vehicle, including: first and second input shafts; an output shaft; first, second, and third lay shafts; no more than sixteen gears; and a plurality of full synchronizer clutches. Each full synchronizer clutch includes: a respective first half synchronizer clutch arranged to non-rotatably connect a respective first gear included in the exactly sixteen gears one of: the first, second, or third lay shafts; and disconnect the respective first gear from the one of: the first, second, or third lay shafts; and a respective second half synchronizer clutch arranged to non-rotatably connect a respective second gear included in the exactly sixteen gears the one of: the first, second, or third lay shafts and disconnect the respective second gear from the one of: the first, second, or third lay shafts. The transmission includes no more than three lay shafts. The transmission is arranged to provide ten forward speed ratios and at least one reverse speed ratio.

According to aspects illustrated herein, there is provided a transmission including: a first number of input shafts arranged to receive torque; an output shaft arranged to transmit torque; a plurality of gears, including a second number of gears non-rotatably connected to the output shaft; a third number of lay shafts; and a plurality of full synchronizer clutches. Each full synchronizer clutch includes: a respective first half synchronizer clutch arranged to non-rotatably connect a respective first gear included in the plurality of gears to a respective lay shaft included in the third number of lay shafts, and disconnect the respective first gear from the respective lay shaft included in the third number of lay shafts; and a respective second half synchronizer clutch arranged to non-rotatably connect a respective second gear included in plurality of gears to the respective lay shaft included in the third number of lay shafts, and disconnect the respective second gear from the respective lay shaft included in the third number of lay shafts. The transmission is arranged to provide a fourth number of total reverse and forward speed ratios equal to the first number multiplied by the second number multiplied by the third number.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
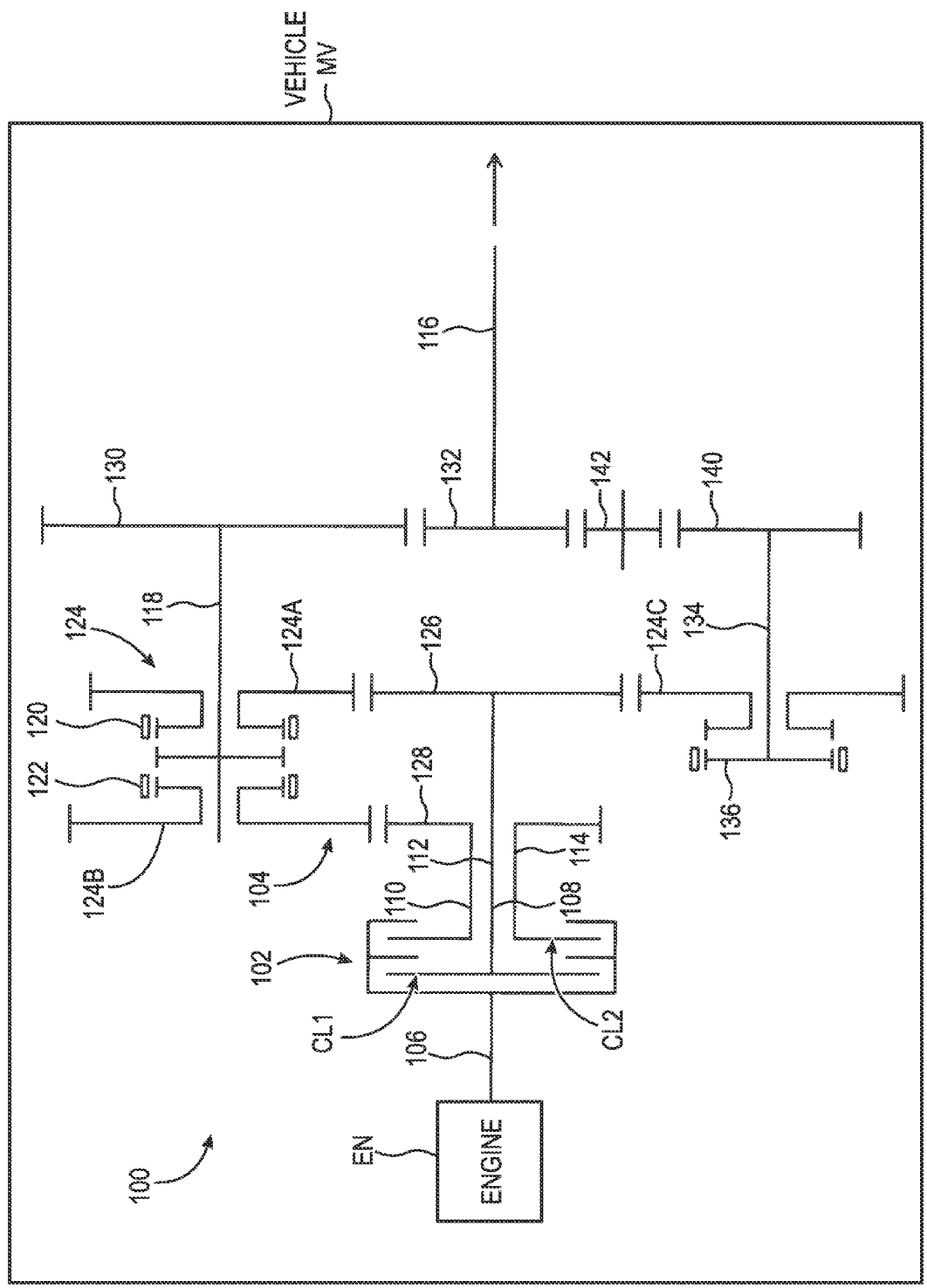
FIG. 1 is a schematic diagram of a transmission assembly including a two-speed transmission and a dual clutch input.

FIG. 1 is a schematic diagram of transmission assembly 100 including a two-speed transmission and a dual clutch input. Assembly 100 includes input assembly 102 and transmission 104 with two-forward speed ratios and one reverse speed ratio. Assembly 102 includes input 106 arranged to receive rotational torque from engine EN for motor vehicle MV and outputs 108 and 110. In an example embodiment, assembly 102 includes clutches CL1 and CL2 with outputs 108 and 110, respectively. Transmission 104 includes input shafts 112 and 114 non-rotatably connected to outputs 108 and 110, respectively, and output shaft 116. Input shafts 112 and 114 are concentric. In an example embodiment, input shaft 112 is concentrically disposed within input shaft 114. Transmission 104 is arranged to provide a plurality of successively increasing ratios of a rotational speed of output shaft 116 with respect to a rotational speed of input 106. Transmission 104 includes: lay shaft 118 and full synchronizer clutch 120/122. Transmission 104 includes gears 124A and 126 for providing a lowest ratio included in the plurality of ratios and gears 124B and 128 for providing a next to lowest ratio included in the plurality of ratios. By "full synchronizer clutch" we mean a synchronizer clutch including two half synchronizer clutch synchronizer clutches, or alternately, two synchronizer sides. Hereinafter, the terms "half synchronizer clutch synchronizer clutch" and "side" of a full synchronizer clutch are used interchangeably. Each half synchronizer clutch synchronizer clutch is arranged to non-rotatably connect a respective gear to a respective lay shaft and to disconnect the respective gear to the respective lay shaft.

To provide the lowest speed ratio (hereinafter referred to as first gear), clutch CL1 is closed and clutch CL2 is opened, output 108 is arranged to transmit torque to rotate gear 126, side 120 of full synchronizer clutch 120/122 is arranged to connect gear 124A to lay shaft 118 and side 122 of full synchronizer clutch 120/122 is arranged to disconnect gear 124B from lay shaft 118. To provide the next to lowest speed ratio (hereinafter referred to as second gear), clutch CL2 is closed and clutch CL1 is opened, output 110 is arranged to transmit torque to rotate gear 128, side 122 of full synchronizer clutch 120/122 is arranged to connect gear 124B to lay shaft 118, and side 120 of full synchronizer clutch 120/122 is arranged to disconnect gear 124A from lay shaft 118.

In an example embodiment, transmission 104 includes: gears 130 and 132 non-rotatably connected to lay shaft 118 and output shaft 116, respectively. Gear 130 is meshed with gear 132. By two gears "meshed with" each other, we mean that rotation of one gear rotates the other gear.

In an example embodiment, to provide a reverse gear, transmission 104 includes lay shaft 134, half synchronizer clutch synchronizer clutch 136, gear 124C, gear 140 non-rotatably connected to lay shaft 134, and idler 142. To provide rotation at output shaft 116 in a rotational direction opposite of a rotational direction for input 106, clutch CL1 is closed and clutch CL2 is opened, synchronizer clutch 136 is arranged to non-rotatably connect gear 124C to lay shaft 34, and output 108 is arranged to rotate to transmit torque.

In the above description of FIG. 1 and the respective discussions of the figures that follow, each gear 124 is shown connected to a respective full synchronizer clutch and the gear and full synchronizer clutch are shown disposed about a respective lay shaft. When a side of synchronizer clutch is closed the associated gear 124 is non-rotatably connected to the associated lay shaft. Thus a torque path is created from an input shaft to the associated lay shaft via the associated gear 124 or a torque path is created from the associated lay shaft to the output shaft via the associated gear 124.

Figure 2:
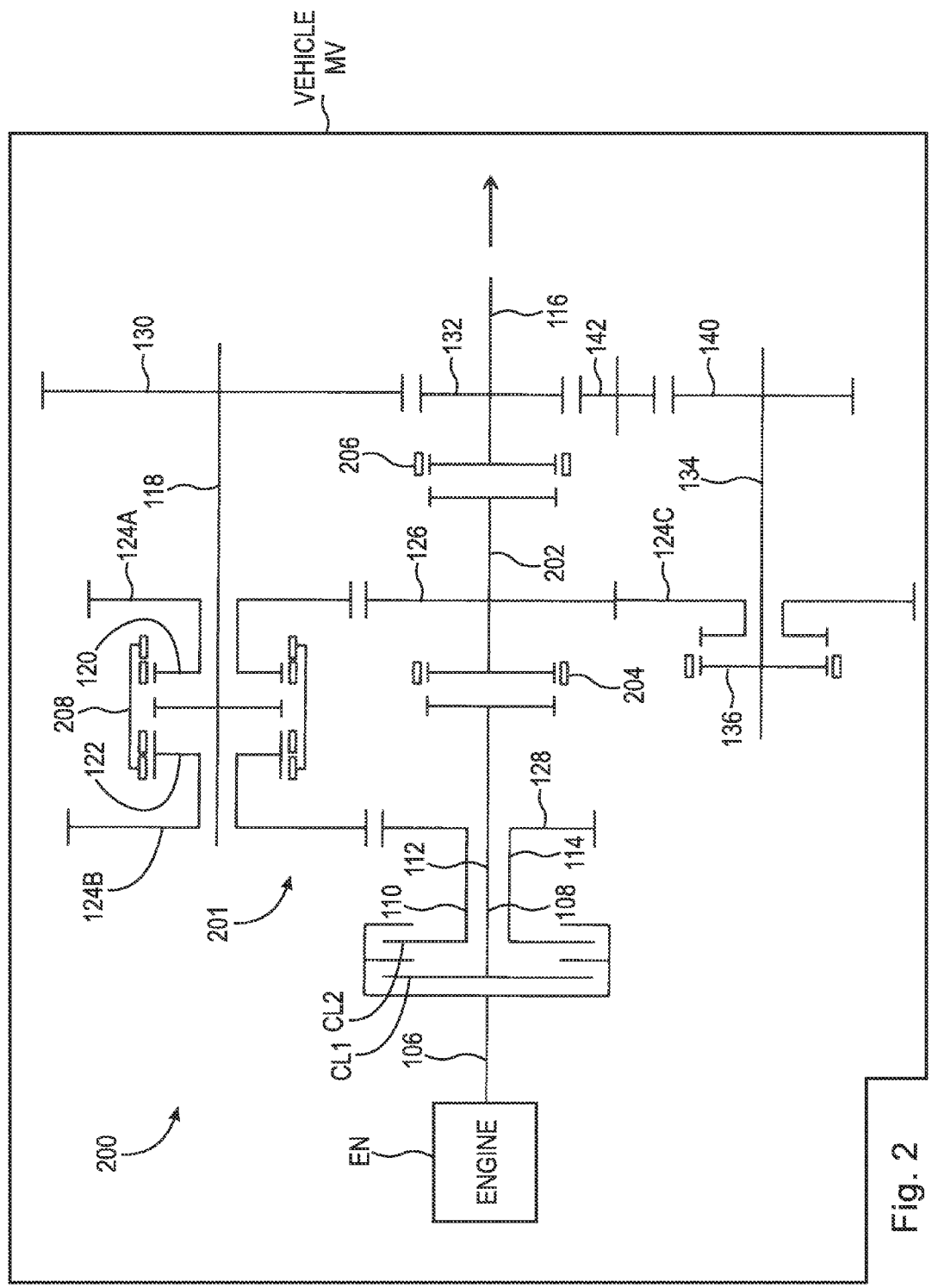
FIG. 2 is a schematic diagram of a transmission assembly including a four-speed transmission and a dual clutch input.

FIG. 2 is a schematic diagram of transmission assembly 200 including a dual clutch input and transmission 201 with four forward speed ratios and two reverse speed ratios. Transmission 201 adds the following to transmission 101: lay shaft 202, half synchronizer clutch synchronizer clutches 204 and 206, and synchronizer 208. Gear 126 is non-rotatably connected to lay shaft 202.

With clutch 204 closed and clutch 206 open, first gear is as described for transmission 100 in FIG. 1. With clutches 204 and 206 open, second gear is as described for transmission 100 in FIG. 1. Remaining gears are provided as follows:

1. Third speed ratio (hereinafter speed ratios are referred to as gears) greater than second gear: synchronizer clutch 204 is arranged to non-rotatably connect input shaft 112 and lay shaft 202; synchronizer clutch 206 is arranged to non-rotatably connect lay shaft 202 and output shaft 116; clutch CL1 is closed; and clutch CL2 is opened. Thus, output 110 is arranged to cease transmitting torque; and output 108 is arranged to rotate to transmit torque. The speed and torque of input 112 are not modified when clutches 204 and 206 are both closed and non-rotatably connect input 112, lay shaft 202 and output 116.

2. Fourth gear greater than third gear: synchronizer 208 is arranged to connect clutches 120 and 122; clutches CL2 and 206 are closed; and clutches CL1 and 204 are opened. Thus, output 110 is arranged to cease transmitting torque; and output 108 is arranged to rotate to transmit torque.

3. Reverse first gear: close clutches CL1, 204, and 136 and open clutch CL2.

4. Reverse second gear: close clutches CL2 and 136, close synchronizer 208, and open clutch CL1.

Figure 3:
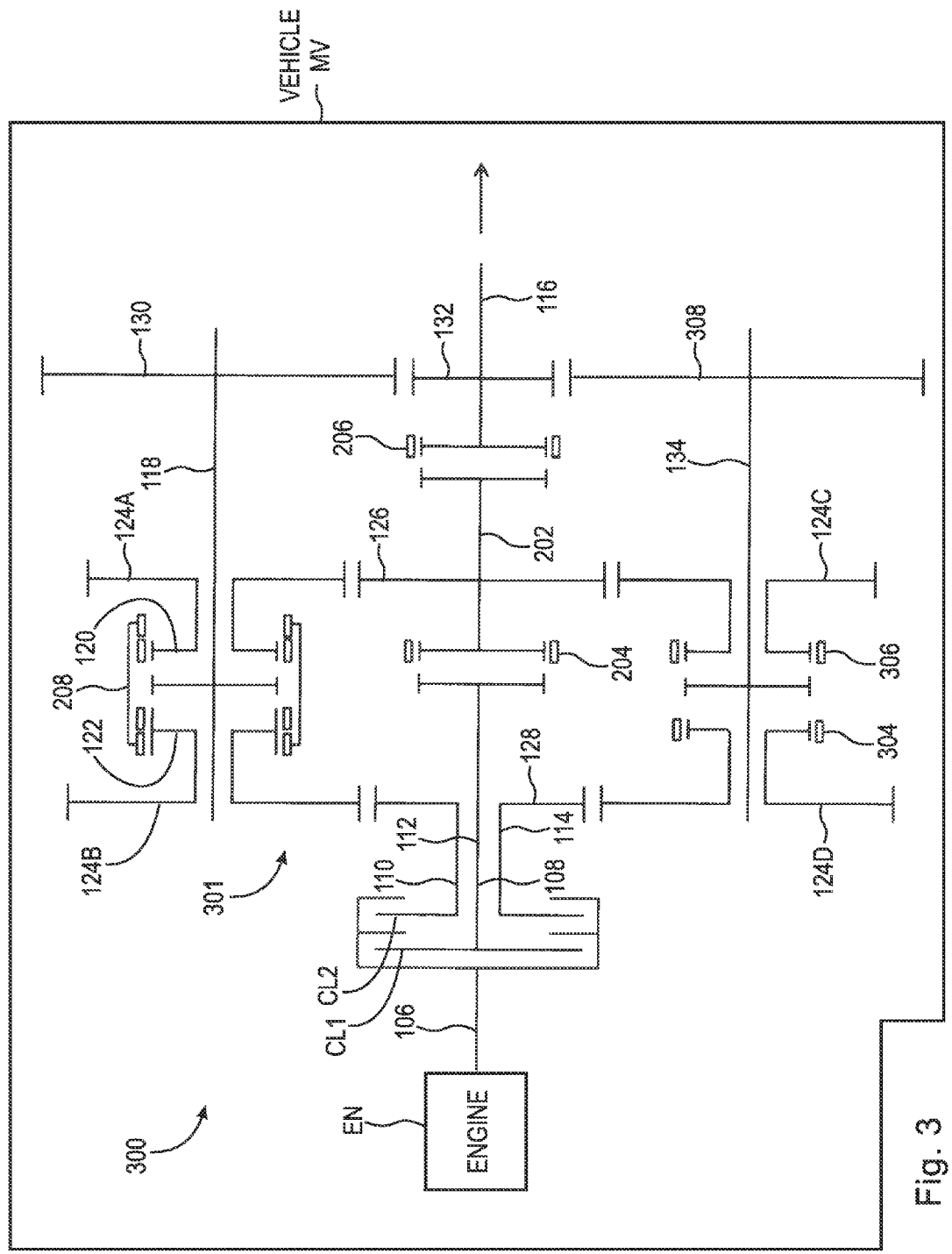
FIG. 3 is a schematic diagram of a transmission assembly including a six-speed transmission and a dual clutch input.

FIG. 3 is a schematic diagram of transmission assembly 300 including six-speed transmission 301 and a dual clutch input. Transmission 301 modifies transmission 201 as follows: adds gear 124D meshed with gear 128, adds hill synchronizer clutch 304/306; and adds gear 308 non-rotatably connected to lay shaft 134 and meshed with gear 132.

Gears are provided as follows:

1. First gear: Close clutches CL1, 204, and side 120 of full synchronizer clutch 120/122; and open clutches CL2 and 206.

2. Second gear: Close clutches CL2, and side 122 of full synchronizer clutch 120/122; and open clutches CL2 and 206; and open clutches CL1, 204 and 206.

3. Third gear: Close clutches CL1, 204 and side 306 of full synchronizer clutch 304/306 and open clutches CL2 and 206.

2. Fourth gear: Close clutches CL2 and side 304 of full synchronizer clutch 304/306; and open clutches CL1, 204, and 206.

3. Fifth gear: Close clutches CL1, 204, and 206; and open clutch CL2.

4. Sixth gear: Close clutches CL2 and 206; close synchronizer 208; and open clutch CL1.

Figure 4:
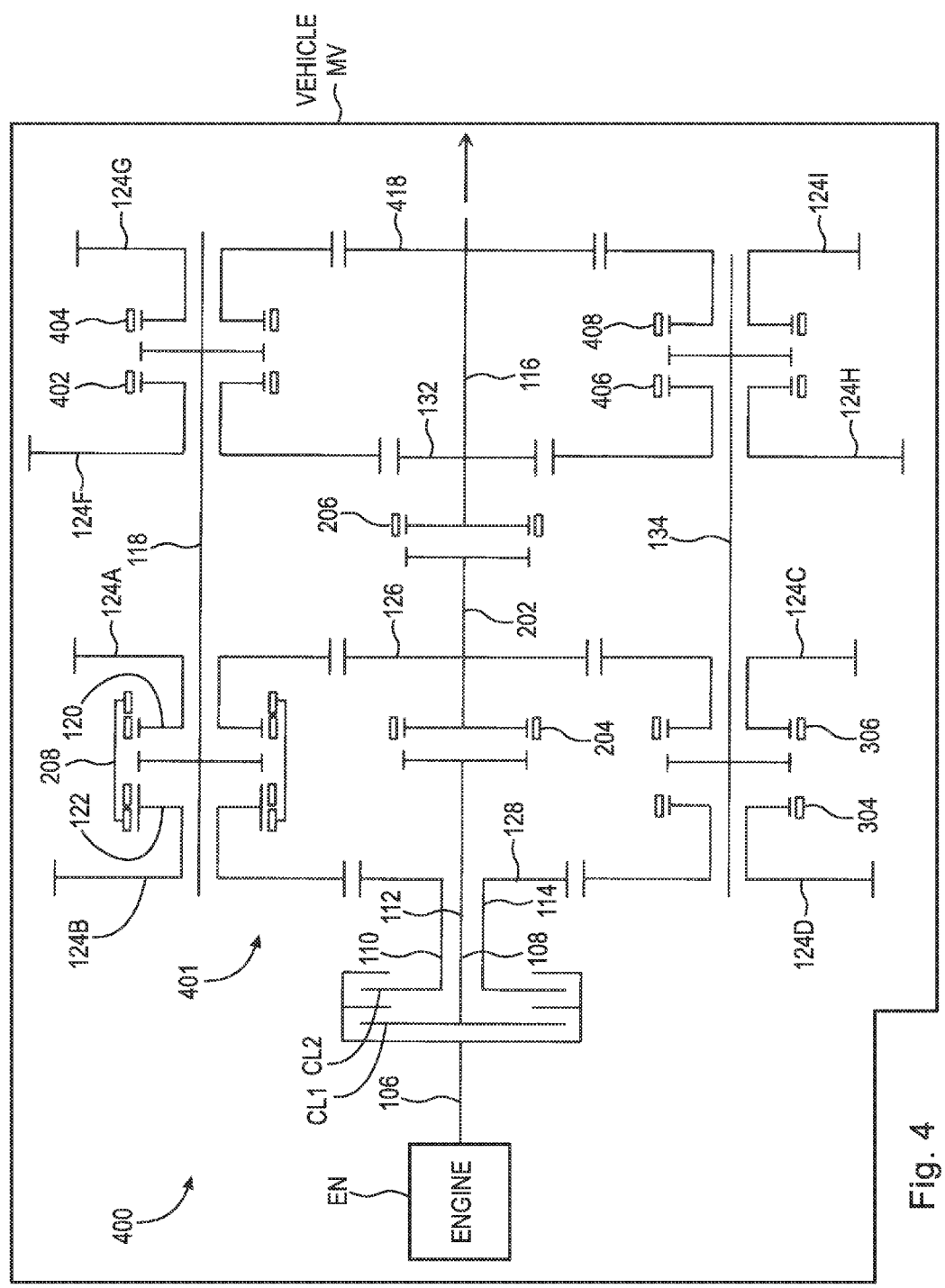
FIG. 4 is a schematic diagram of a transmission assembly including a ten-speed transmission and a dual clutch input based on the architecture of the transmission in FIG. 3.

FIG. 4 is a schematic diagram of transmission assembly 400 including a dual clutch input and transmission 401 with ten forward speed radios and two reverse speed ratios, based on the architecture of transmission 301. Transmission 401 adds the following to transmission 301: gear 418 non-rotatably connected to output 116; and gears 124F through 124 meshed with gears 132, 418, 132, and 418, respectively, and full synchronizer clutches 402/404 and 406/408.

Gears are provided as follows:

1. First gear: Close clutches CL1, 204, side 120 of full synchronizer clutch 120/122; and side 402 of full synchronizer clutch 402/404; and open clutches CL2 and 206.

2. Second gear: Close clutches CL2, side 122 of full synchronizer clutch 120/122, and side 402 of full synchronizer clutch 402/404; and open clutches CL1, 204 and 206.

3. Third gear: Close clutches CL1, 204, side 302 of full synchronizer clutch 302/304, and side 406 of full synchronizer clutch 406/408; and open clutches CL2, and 206.

4. Fourth gear: Close clutches CL2, side 302 of full synchronizer clutch 302/304, and side 406 of full synchronizer clutch 406/408; and open clutches CL1, 204, and 206.

5. Fifth gear: Close clutches CL1, 204, side 306 of full synchronizer clutch 304/306, and 408, side 408 of full synchronizer clutch 406/408 and open clutches CL2 and 206.

6. Sixth gear: Close clutches CL2, side 304 of full synchronizer clutch 304/306, and side 408 of full synchronizer clutch 406/408; and open clutches CL1, 204, and 206.

7. Seventh gear: Close clutches CL1, 204, side 120 of full synchronizer clutch 120/122, and side 404 of full synchronizer clutch 402/404; and open clutches CL2 and 206.

8. Eighth gear: Close clutches CL2, side 122 of full synchronizer clutch 120/122, and side 404 of full synchronizer clutch 402/404; and open clutches CL1, 204, and 206.

9. Ninth gear: Close clutches CL1, 204, and 206; and open clutch CL2.

10. Tenth gear: Close clutches CL2 and 206; close synchronizer 208; and open clutches CL1 and 204.

Figure 5:
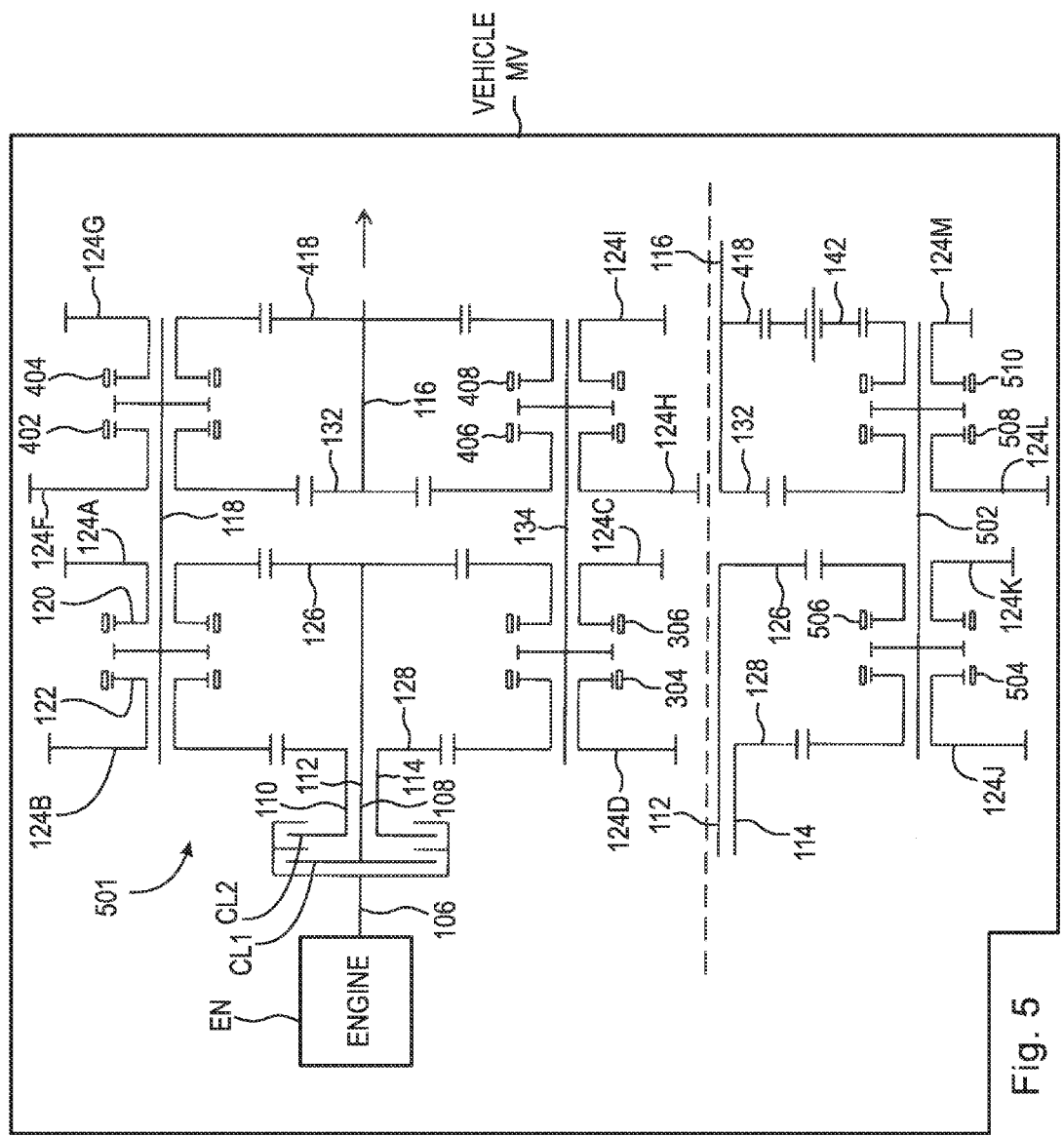
FIG. 5 is a schematic diagram of a transmission assembly including a ten-speed transmission and a dual clutch input.

FIG. 5 is a schematic diagram of transmission assembly 500 including a dual clutch input and transmission 501 with ten forward speed ratios and two reverse speed ratios. Transmission 501 removes synchronizer clutches 204 and 206 from transmission 401 and adds: lay shaft 502; gears 124J through 124L meshed with gears 128, 126, and 132, respectively; full synchronizer clutches 504/506 and 508/510; idler 142; and gear 124M.

Gears are provided as follows:

1. First gear: Close clutches CL1, side 120 of full synchronizer clutch 120/122, and side 402 of full synchronizer clutch 402/404; and open clutch CL2.

2. Second gear: Close clutches CL2, side 122 of full synchronizer clutch 120/122, and side 402 of full synchronizer clutch 402/404; and open clutch CL1.

3. Third gear: Close clutches CL1, side 306 of full synchronizer clutch 304/306, and side 406 of full synchronizer clutch 406/408; and open clutch CL2.

4. Fourth gear: Close clutches CL2, side 304 of full synchronizer clutch 304/306, and side 406 of full synchronizer clutch 406/408; and open clutch CL1.

5. Fifth gear: Close clutches CL1, side 506 of full synchronizer clutch 504/506, and side 508 of full synchronizer clutch 508/510; and open clutch CL2.

6. Sixth gear: Close clutches CL2, side 504 of full synchronizer clutch 504/506, side 508 of full synchronizer clutch 508/510; and open clutch CL1.

9. Seventh gear: Close clutches CL1, side 120 of full synchronizer clutch 120/122, and side 404 of full synchronizer clutch 402/404; and open clutch CL2.

8. Eighth gear: Close clutches CL2, side 122 of full synchronizer clutch 120/122, and side 404 of full synchronizer clutch 402/404; and open clutch CL1.

9. Ninth gear: Close clutches CL1, side 306 of full synchronizer clutch 304/306, and side 408 of full synchronizer clutch 406/408; and open clutch CL2.

10. Tenth gear: Close clutches CL2, side 304 of full synchronizer clutch 304/306, and side 408 of full synchronizer clutch 406/408; and open clutch CL1.

11. Reverse first gear: close clutches CL1, 506, and 510 and open clutch CL2.

12. Reverse second gear: close clutches CL2, 504, and 510 and open clutch CL1.

Advantageously, reverse lay shaft 502 is used to gain two additional forward gears compared to transmission 401 and transmission 1301 (described below). Thus, size, weight, cost, and complexity increases associated with attaining the two additional forward gears are minimized.

Figure 6:
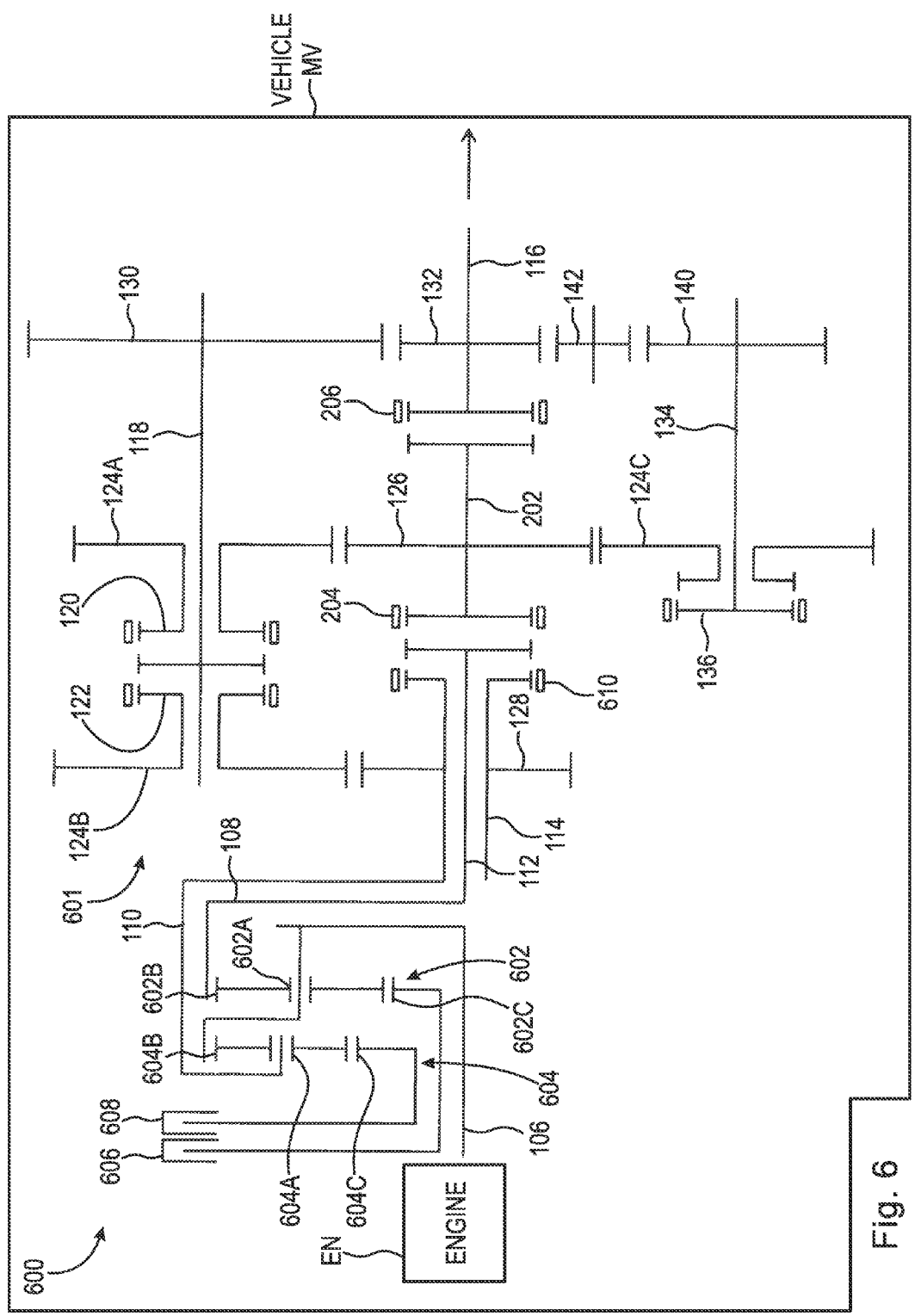
FIG. 6 is a schematic diagram of a transmission assembly including a four-speed transmission and a dual planetary gear input.

FIG. 6 is a schematic diagram of transmission assembly 600 including a dual planetary gear input and transmission 601 with four forward speed ratios and two reverse speed ratios. Transmission 601 modifies transmission 201 as follows: removes synchronizer 208; and adds half synchronizer clutch synchronizer clutch 610 to form full synchronizer clutch 610/204. In assembly 600, assembly 102 includes planetary gear sets 602 and 604 and brakes 606 and 608. Planetary gear set 602 includes component 602A connected to input 106 and component 602B connected to output 108. Planetary gear set 604 includes component 604A connected to output 110. In an example embodiment, components 602A and 602B are a planetary carrier and a ring gear, respectively, and component 604A is a planetary gear. In an example embodiment, planetary carrier 602A is connected to ring gear 604B and sun gears 602C and 604C are connected to brakes 606 and 608, respectively.

The functions described for clutches CL1 and CL2 for transmission 201 are performed by planetary gears sets 604 and 606, respectively. For example, for operations requiring clutch CL1 to close and clutch CL2 to open, component 602C is grounded (fixed against rotation) by closing or engaging brake 606 and brake 608 is left open or unengaged. For example, for operations requiring clutch CL2 to close and clutch CL1 to open, component 604C is grounded (fixed against rotation) by closing or engaging brake 608 and brake 606 is left open or unengaged.

Advantageously, since brakes 606 and 608 do not rotate, unlike clutches CL1 and CL2, the brakes can be moved radially outward of input 106.

Gears are provided as follows:
1. First gear: Close brake 606, side 204 of full synchronizer clutch 610/204, and side 120 of full synchronizer clutch 120/122; and open brake 608 and clutch 206.
2. Second gear: Close brake 608 and side 122 of full synchronizer clutch 120/122; and open brake 606 and clutches 610/204 and 206.
3. Third gear: Close brake 606; side 204 of full synchronizer clutch 610/204, and clutch 206; and open brake 608 and clutch 610.
4. Fourth gear: Close brake 608, full synchronizer clutch 610/204, and clutch 206; and open brake 606.
5. Reverse first gear: close clutches CL1, 204, and 136 and open clutch CL2.
6. Reverse second gear: close clutches CL2, 610, 204, and 136 and open clutch CL1.

Figure 7:
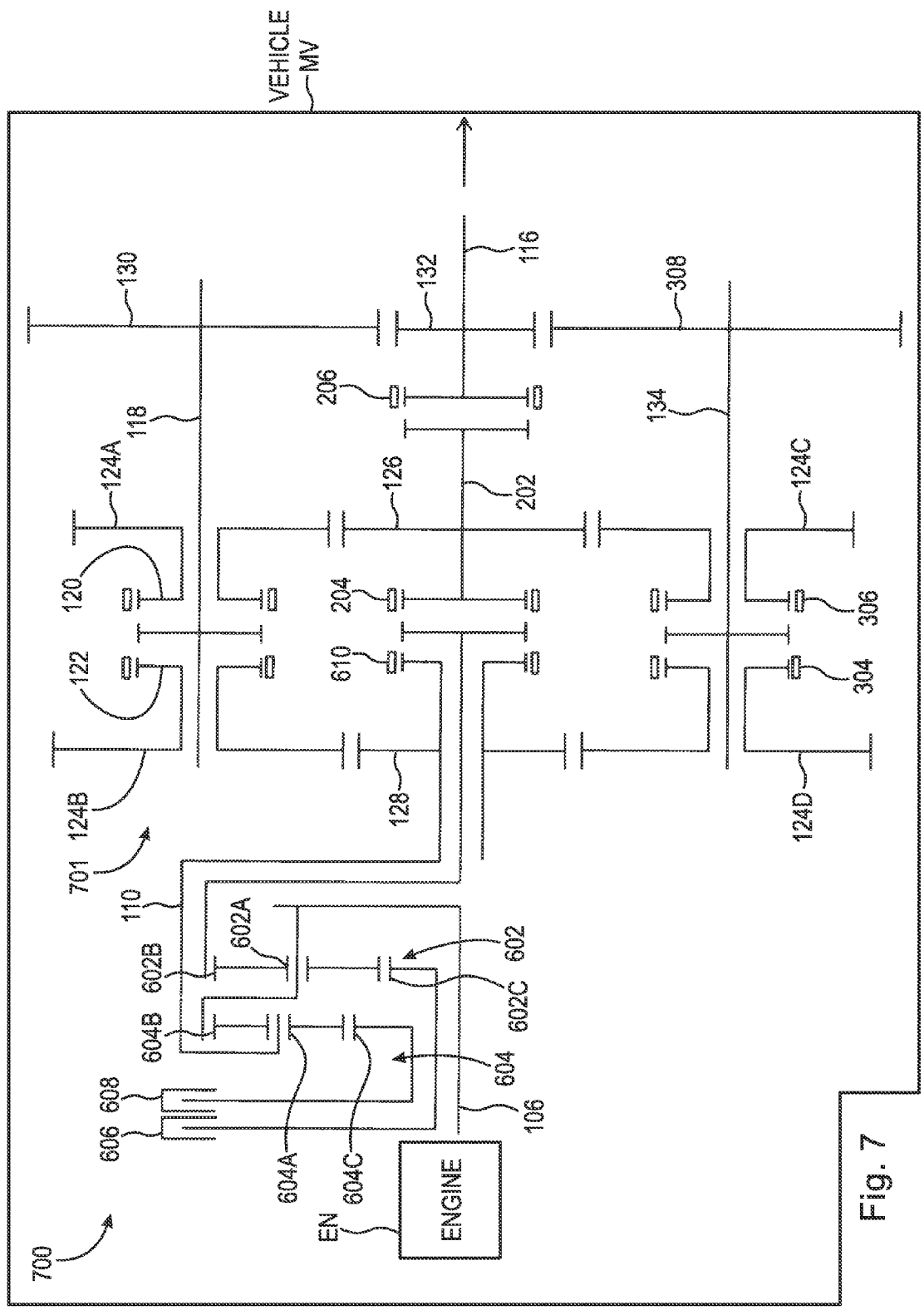
FIG. 7 is a schematic diagram of a transmission assembly including a six-speed transmission and a dual planetary gear input.

FIG. 7 is a schematic diagram of transmission assembly 700 including six-speed transmission 701 and a dual planetary gear input. Assembly 700 includes transmission 701 and planetary gear sets 602 and 604. Transmission 701 adds synchronizer clutch 610 to transmission 301. The functions described for clutches CL1 and CL2 for transmission 301 are performed by planetary gears sets 604 and 606, respectively. For example, for operations requiring clutch CL1 to close and clutch CL2 to open, component 602C is grounded (fixed against rotation) by closing or engaging brake 606 and brake 608 is left open or unengaged. For example, for operations requiring clutch CL2 to close and clutch CL1 to open, component 604C is grounded (fixed against rotation) by closing or engaging brake 608 and brake 606 is left open or unengaged. Transmission 701 adds synchronizer 610 to transmission 301.

Gears are provided as follows:
1. First gear: Close brake 606, side 204 of full synchronizer clutch 610/204, and side 120 of full synchronizer clutch 120/122; and open brake 608 and clutch 206.
2. Second gear: Close brake 608 and side 122 of full synchronizer clutch 120/122; and open brake 606 and clutches 610/204, and 206.
3. Third gear: Close brake 606, side 204 of full synchronizer clutch 610/204, and side 306 of full synchronizer clutch 304/306; and open brake 608 and clutches 610 and 206.
2. Fourth gear: Close brake 608 and side 304 of full synchronizer clutch 304/306; and open brake 606 and clutches 610/204, and 206.
3. Fifth gear: Close brake 606, side 204 of full synchronizer clutch 610/204, and clutch 206; and open brake 608.
4. Sixth gear: Close brake 608, side 610 of full synchronizer clutch 610/204, and clutch 206; and open brake 606.

Figure 8:
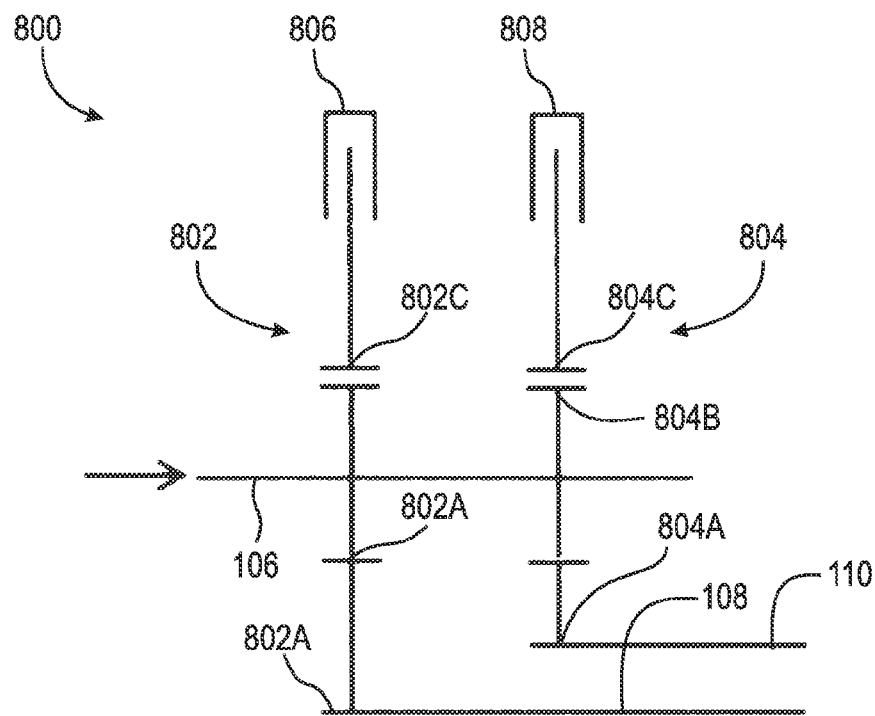
FIG. 8 is a schematic diagrams of a planetary gear configuration usable for an input assembly.

FIG. 8 is a schematic diagrams of planetary gear configuration 800 usable for an input assembly. In FIG. 8, configuration 800 includes planetary gear sets 802 and 804 and brakes 806 and 808. Input 106 is connected to planetary carrier 802A and output 108 is connected to sun gear 802B. Sun gear 804A is connected to output 110. Carrier 802A is connected to planetary carrier 804B. Ring gears 802C and 804C are connected to brakes 806 and 808, respectively. The functions described for clutches CL1 and CL2 are performed by planetary gears sets 802 and 804, respectively. For example, for operations requiring clutch CL1 to close and clutch CL2 to open, ring gear 802C is grounded (fixed against rotation) by closing or engaging brake 806 and brake 808 is left open or unengaged. For example, for operations requiring clutch CL2 to close and clutch CL1 to open, ring gear 804C is grounded (fixed against rotation) by closing or engaging brake 808 and brake 806 is left open or unengaged. Configuration 800 provides a speed ratio of 0.2 to 0.4.

Figure 9:
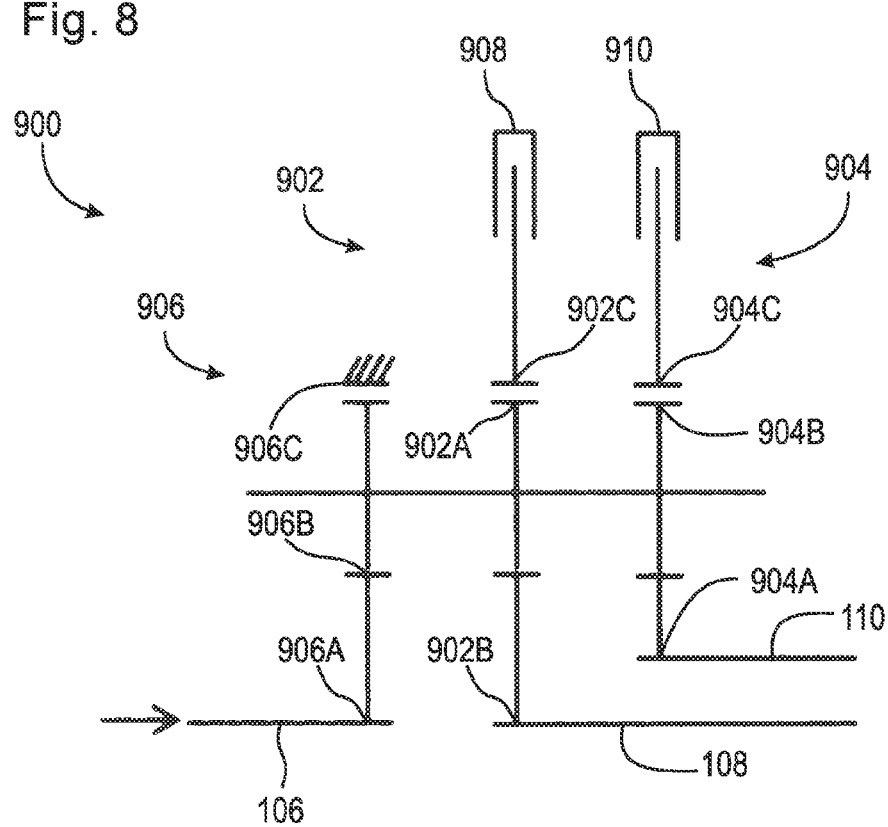
FIG. 9 is a schematic diagrams of a planetary gear configuration usable for an input assembly.

FIG. 9 is a schematic diagrams of planetary gear configuration 900 usable for an input assembly. In FIG. 9, configuration 900 includes planetary gear sets 902, 904, and 906 and brakes 908 and 910. Input 106 is connected to sun gear 906A, carrier 906B is connected to carrier 902A. Sun gear 902B is connected to output 108 and sun gear 904A is connected to output 110. Carrier 902A is connected to planetary carrier 904B. Ring gears 902C and 904C are connected to brakes 908 and 910, respectively. The functions described for clutches CL1 and CL2 are performed by planetary gears sets 902 and 904, respectively. For example, for operations requiring clutch CL1 to close and clutch CL2 to open, ring gear 902C is grounded (fixed against rotation) by closing or engaging brake 908 and brake 910 is left open or unengaged. For example, for operations requiring clutch CL2 to close and clutch CL1 to open, ring gear 904C is grounded (fixed against rotation) by closing or engaging brake 910 and brake 908 is left open or unengaged. The addition of gear set 906 enables a speed ratio of 0.8 to 1.2 for configuration 900.

Figure 10:
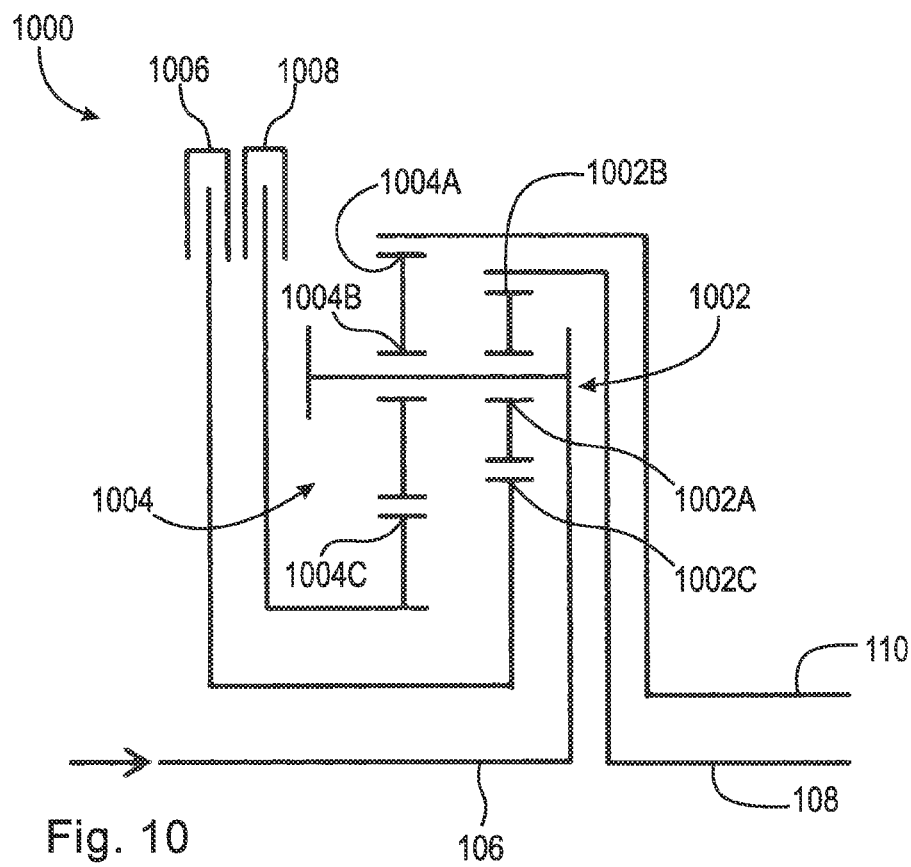
FIG. 10 is a schematic diagrams of a planetary gear configuration usable for an input assembly.

FIG. 10 is a schematic diagrams of planetary gear configuration 1000 usable for an input assembly. In FIG. 10, configuration 1000 includes planetary gear sets 1002 and 1004 and brakes 1006 and 1008. Input 106 is connected to planetary carrier 1002A and output 108 is connected to ring gear 1002B. Ring gear 1004A is connected to output 110. Carrier 1002A is connected to planetary carrier 1004B. Sun gears 1002C and 1004C are connected to brakes 1006 and 1008, respectively. The functions described for clutches CL1 and CL2 are performed by planetary gears sets 1002 and 1004, respectively. For example, for operations requiring clutch CL1 to close and clutch CL2 to open, sun gear 1002C is grounded (fixed against rotation) by closing or engaging brake 1006 and brake 1008 is left open or unengaged. For example, for operations requiring clutch CL2 to close and clutch CL1 to open, sun gear 1004C is grounded (fixed against rotation) by closing or engaging brake 1008 and brake 1006 is left open or unengaged. Configuration 1000 provides a speed ratio of 0.6 to 0.8.

Figure 11:
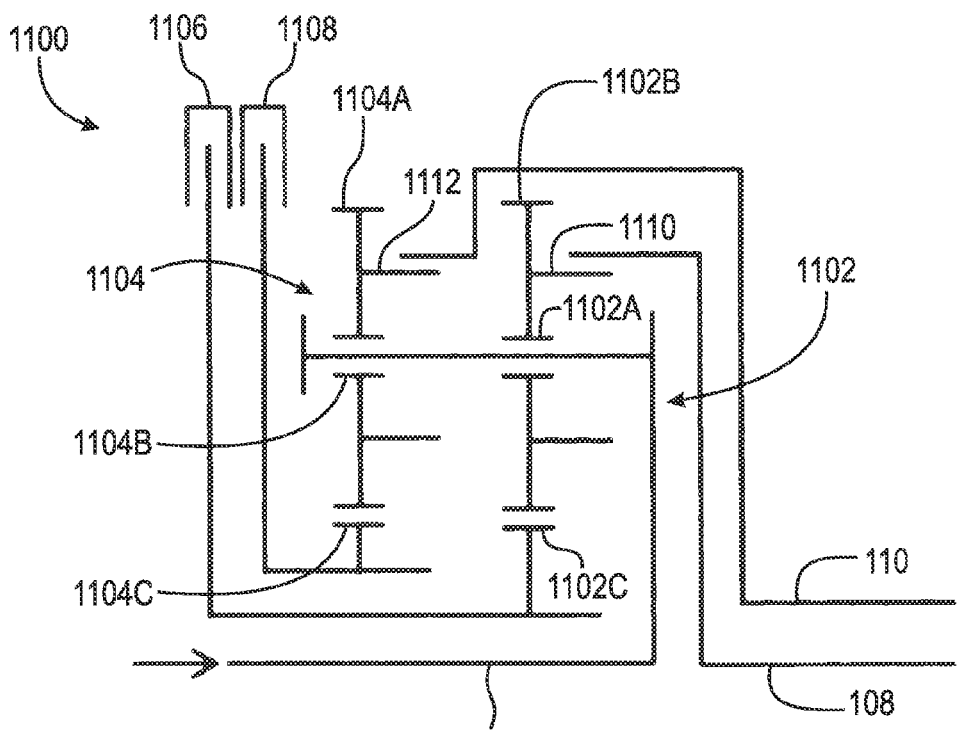
FIG. 11 is a schematic diagrams of a planetary gear configuration usable for an input assembly.

FIG. 11 is a schematic diagrams of planetary gear configuration 1100 usable for an input assembly. In FIG. 11, configuration 1100 includes planetary gear sets 1102 and 1104, brakes 1106 and 1108 and auxiliary gears 1110 and 1112. Input 106 is connected to planetary carrier 1102A and output 108 is connected gear 1110, which is meshed with ring gear 1102B. Auxiliary gear 1112 is meshed with ring gear 1104A and connected to output 110. Carrier 1102A is connected to planetary carrier 1104B. Sun gears 1102C and 1104C are connected to brakes 1106 and 1108, respectively. The functions described for clutches CL1 and CL2 are performed by planetary gears sets 1102 and 1104, respectively. For example, for operations requiring clutch CL1 to close and clutch CL2 to open, sun gear 1102C is grounded (fixed against rotation) by closing or engaging brake 1106 and brake 1108 is left open or unengaged. For example, for operations requiring clutch CL2 to close and clutch CL1 to open, sun gear 1104C is grounded (fixed against rotation) by closing or engaging brake 1108 and brake 1106 is left open or unengaged. Configuration 900 provides a speed ratio of 1 to 1.3.

Figure 12:
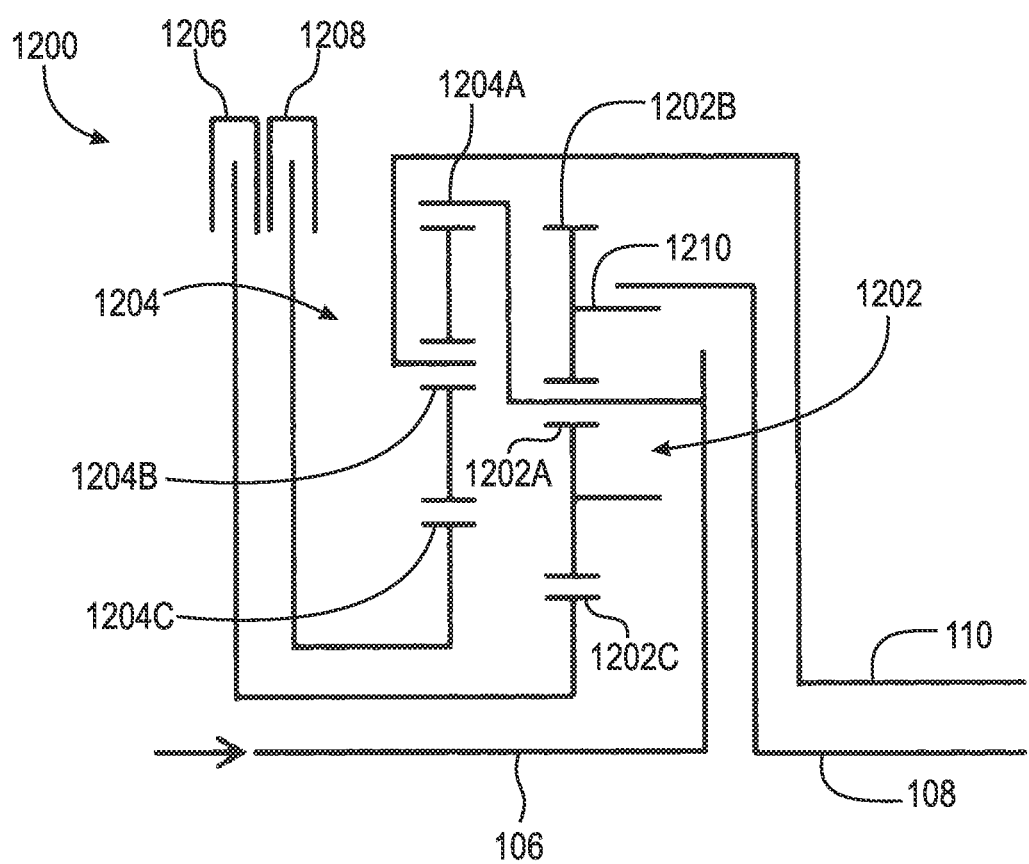
FIG. 12 is a schematic diagrams of a planetary gear configuration usable for an input assembly.

FIG. 12 is a schematic diagrams of planetary gear configuration 1200 usable for an input assembly. In FIG. 12, configuration 1200 includes planetary gear sets 1202 and 1204, brakes 1206 and 1208 and auxiliary gear 1210. Input 106 is connected to planetary carrier 1202A and output 108 is connected gear 1210, which is meshed with ring gear 1202B. Planetary carrier 1204B' is connected to output 110. Carrier 1202A is connected to ring gear 1204A. Sun gears 1202C and 1204C are connected to brakes 1206 and 1208, respectively. The functions described for clutches CL1 and CL2 are performed by planetary gears sets 1202 and 1204, respectively. For example, for operations requiring clutch CL1 to close and clutch CL2 to open, sun gear 1202C is grounded (fixed against rotation) by closing or engaging brake 1206 and brake 1208 is left open or unengaged. For example, for operations requiring clutch CL2 to close and clutch CL1 to open, sun gear 1204C is grounded (fixed against rotation) by closing or engaging brake 1208 and brake 1206 is left open or unengaged. Configuration 1000 provides a speed ratio of 1.25 to 1.69.

Figure 13:
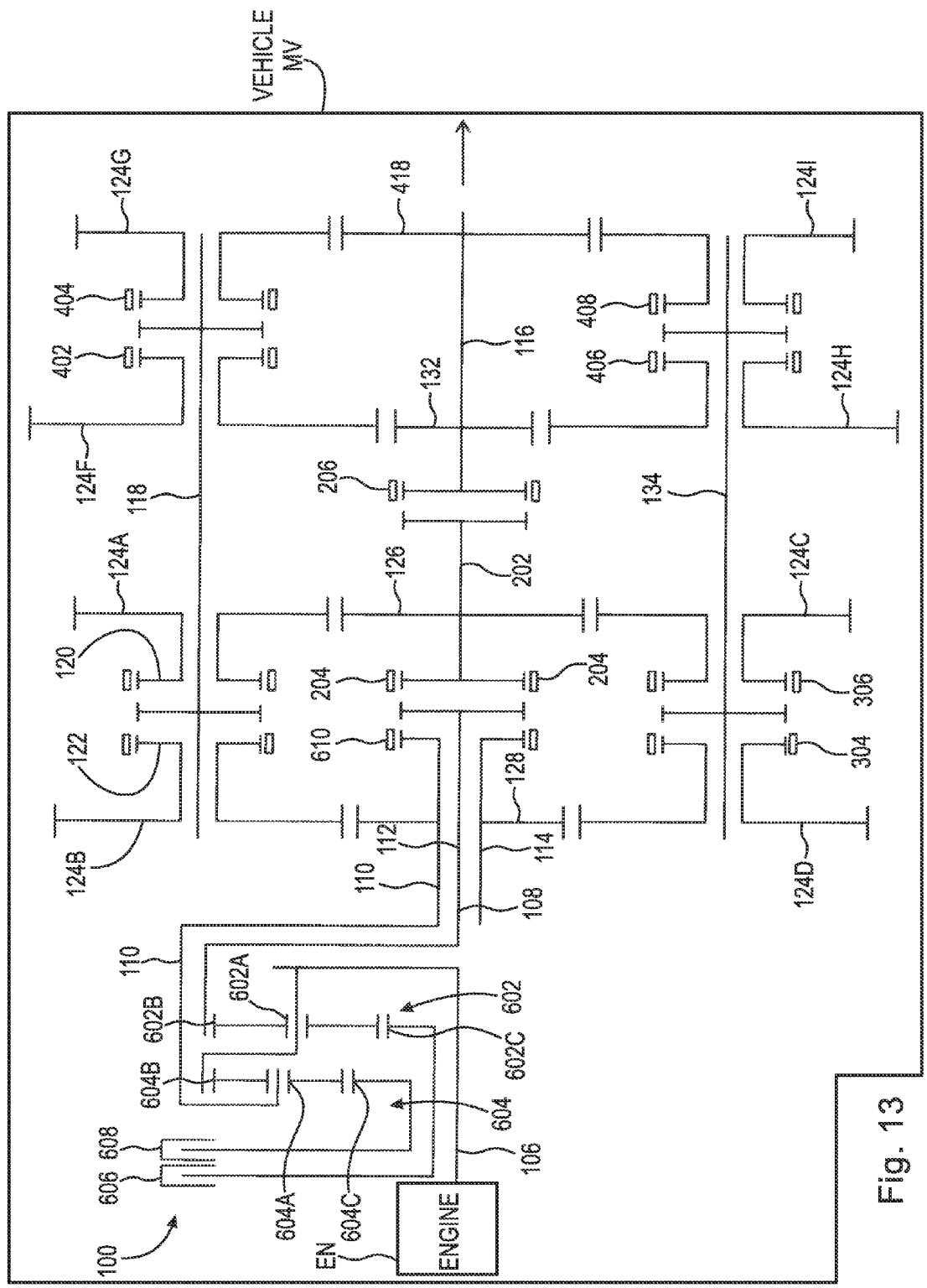
FIG. 13 is a schematic diagram of a transmission assembly including a ten-speed transmission and a dual planetary gear input.
Figure 14:
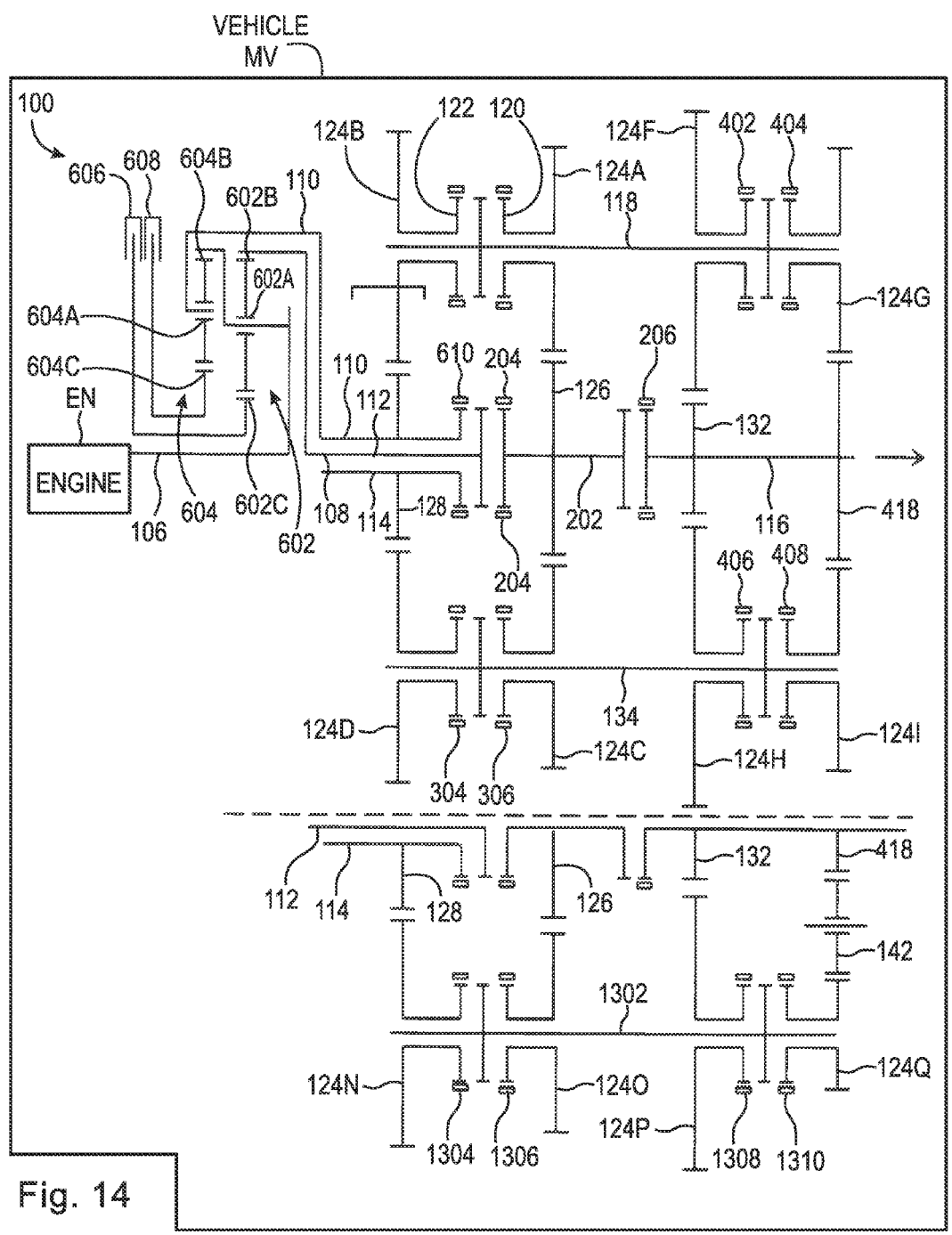
FIG. 14 is a schematic diagram of a transmission assembly including a 12-speed transmission and a dual planetary gear input; and, FIG. 15 is a schematic diagram of a transmission assembly including a ten-speed transmission and a dual-clutch input.

FIG. 13 is a schematic diagram of transmission assembly 1300 including ten-speed transmission 1301 and a dual clutch input. Transmission 1301 adds half synchronizer clutch synchronizer 610 to transmission 401 to form full synchronizer clutch 610/204.

Gears are provided as follows:
1. First gear: Close brake 606, side 204 of full synchronizer clutch 610/204, side 120 of full synchronizer clutch 120/122, and side 402 of full synchronizer clutch 402/404; and open brake 608 and clutch 206.
2. Second gear: Close brake 608 and side 122 of full synchronizer clutch 120/122, and side 402 of full synchronizer clutch 402/404; and open brake 606 and clutches 610/204, and 206.
3. Third gear: Close brake 606, side 204 of full synchronizer clutch 610/204, side 306 of full synchronizer clutch 304/306, and side 406 of full synchronizer clutch 406/408; and open brake 608 and clutch 206.
4. Fourth gear: Close brake 608, side 304 of full synchronizer clutch 304/306, and side 406 of full synchronizer clutch 406/408; and open brake 606 and clutches 610/204, and 206.
5. Fifth gear: Close brake 606, side 204 of full synchronizer clutch 610/204, side 306 of full synchronizer clutch 304/306, and side 408 of full synchronizer clutch 406/408; and open brake 608 and clutch 206.
6. Sixth gear: Close brake 608, side 304 of full synchronizer clutch 304/306 and side 408 of full synchronizer clutch 406/408; and open brake 606 and clutches 610/204, and 206.
7. Seventh gear: Close brake 606, side 204 of full synchronizer clutch 610/204, side 120 of full synchronizer clutch 120/122, and side 404 of full synchronizer clutch 402/404; and open brake 608 and clutch 206.
8. Eighth gear: Close brake 608, side 122 of full synchronizer clutch 120/122, and side 404 of full synchronizer clutch 402/404; and open brake 606 and clutches 610/204, and 206.
9. Ninth gear: Close brake 606, side 204 of full synchronizer clutch 610/204 and clutch 206; and open brake 608.
10. Tenth gear: Close brake 608 and side 610 of full synchronizer clutch 610/204, and clutch 206; and open brake 606.

FIG. 114 is a schematic diagram of transmission assembly 1400 including a dual planetary gear input and transmission 1401 with twelve forward speed ratios and two reverse speed ratios. Transmission 1401 adds to transmission 1301: lay shaft 1302; gears 124N through 124P meshed with gears 128, 126, and 132, respectively; fill synchronizer clutches 1304/1306 and 1308/1310; gear 124Q; and idler 142.

Gears are provided as follows:
1. First gear: Close brake 606, side 204 of full synchronizer clutch 610/204, side 120 of full synchronizer clutch 120/122, and side 402 of full synchronizer clutch 402/404; and open brake 608 and clutch 206.
2. Second gear: Close brake 608, side 122 of full synchronizer clutch 120/122, and side 402 of full synchronizer clutch 402/404; and open brake 606 and clutches 610/204, and 206.
3. Third gear: Close brake 606, side 204 of full synchronizer clutch 610/204, side 306 of full synchronizer clutch 304/306, and side 406 of full synchronizer clutch 406/408; and open brake 608 and clutch 206.
4. Fourth gear: Close brake 608, side 302 of full synchronizer clutch 304/306 and side 406 of full synchronizer clutch 406/408; and open brake 606 and clutches 610/204, and 206.
5. Fifth gear: Close brake 606, side 204 of full synchronizer clutch 610/204, side 122 of full synchronizer clutch 120/122, and side 404 of full synchronizer clutch 402/404; and open brake 608 and clutch 206.
6. Sixth gear: Close brake 608, side 122 of full synchronizer clutch 120/122, and side 404 of full synchronizer clutch 402/404; and open brake 606 and clutches 610/204, and 206.
7. Seventh gear: Close brake 606, side 204 of full synchronizer clutch 610/204, side 306 of full synchronizer clutch 304/306, and side 408 of full synchronizer clutch 406/408; and open brake 608 and clutches 610 and 206.
8. Eighth gear: Close brake 608, side 304 of full synchronizer clutch 304/306, and side 408 of full synchronizer clutch 406/408; and open brake 606 and clutches 610/204, and 206.
9. Ninth gear: Close brake 606, side 1306 of full synchronizer clutch 1304/1306 and 1306 and side 1308 of frill synchronizer clutch 1308/1310; and open brake 608 and clutches 610/204, and 206.
10. Tenth gear: Close brake 608 side 1304 of full synchronizer clutch 1304/1306 and 1306, and side 1308 of full synchronizer clutch 1308/1310; and open brake 606 and clutches 610/204, and 206.
11. Eleventh gear: Close brake 606, side 204 of full synchronizer clutch 610/204, and clutch 206; and open brake 608.
12. Twelfth gear: Close brake 608 sides 120 and 122 of full synchronizer clutch 120/122, and clutches 206; and open brake 606 and clutches 610/204.
14. Reverse first gear: close clutches CL1, 1306, and 1310 and open clutch CL2.
16. Reverse second gear: dose clutches CL2, 1304, and 1310 and open clutch CL1.

Figure 15:
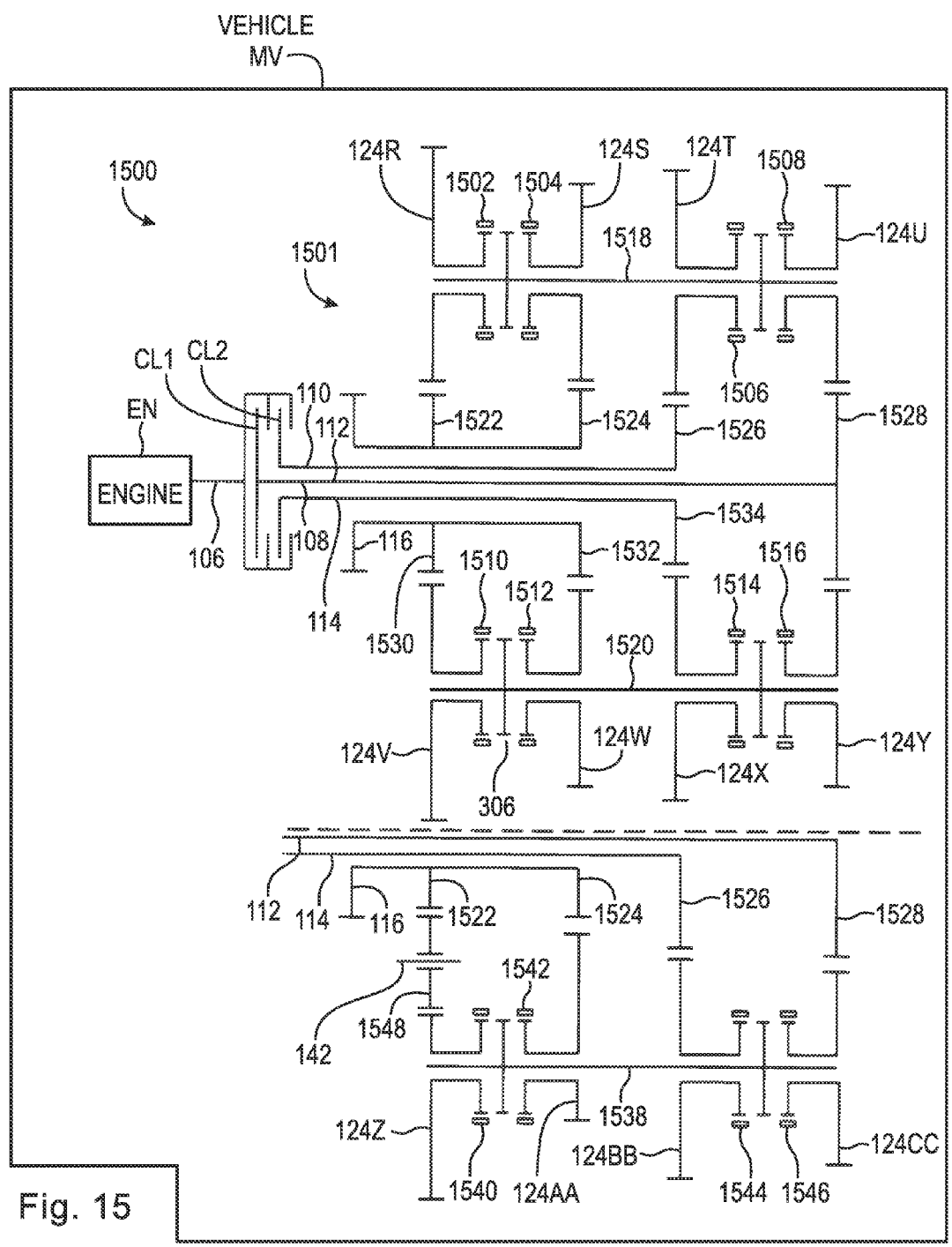

FIG. 15 is a schematic diagram of transmission assembly 1500 a dual clutch input and transmission 1501 with ten forward speed ratios and two reverse speed ratios. Transmission 1501 includes: lay shafts 1518 and 1520; gears 124R through 124Y; full synchronizer clutches 1502/1504, 1506/1508, 1510/1512, and 1514/1516; and gear 1522 non-rotatably connected to output 116 and meshed with gear 124R, gear 1524 non-rotatably connected to output 116 and meshed with gear 124S, gear 1526 non-rotatably connected to input shaft 114 and meshed with gear 124T, gear 1528 non-rotatably connected to input shaft 112 and meshed with gears 124U and 124Y, gear 1530 non-rotatably connected to output 116 and meshed with gear 124V, gear 1532 non-rotatably connected to output 116 and meshed with gear 124W, and gear 1534 non-rotatably connected to input shaft 114 and meshed with gear 124X.

Transmission 1501 also includes lay shaft 1538; gears 124AA through 124CC meshed with gears 1524, 1526, and 1528, respectively; full synchronizer clutches 1540/1542 and 1544/1546; idler 142, and gear 124Z.

Gears are provided as follows:

1. First gear: Close clutches CL1, side 1504 of full synchronizer clutch 1502/1504, and side 1508 of full synchronizer clutch 1506/1508; and open clutch CL2.

2. Second gear: Close clutches CL2, side 1504 of full synchronizer clutch 1502/1504, and side 1506 of full synchronizer clutch 1506/1508; and open clutch CL1.

3. Third gear: Close clutches CL1, side 1512 of full synchronizer clutch 1510/1512, and side 1516 of full synchronizer clutch 1514/1516; and open clutch CL2.

4. Fourth gear: Close clutches CL2, side 1512 of full synchronizer clutch 1510/1512, and side 1514 of full synchronizer clutch 1514/1516; and open clutch CL1.

5. Fifth gear: Close clutches CL1, side 1542 of full synchronizer clutch 1540/1542, and side 1546 of full synchronizer clutch 1544/1546; and open clutch CL2.

6. Sixth gear: Close clutches CL2, side 1542 of full synchronizer clutch 1540/1542, and side 1544 of full synchronizer clutch 1544/1546; and open clutch CL1.

9. Seventh gear: Close clutches CL1, side 1502 of full synchronizer clutch 1502/1504, and side 1508 of full synchronizer clutch 1506/1508; and open clutch CL2.

8. Eighth gear: Close clutches CL2, side 1502 of full synchronizer clutch 1502/1504, and side 1506 of full synchronizer clutch 1506/1508; and open clutch CL1.

9. Ninth gear: Close clutches CL1, side 1510 of full synchronizer clutch 1510/1512, and side 1516 of full synchronizer clutch 1514/1516; and open clutch CL2.

10. Tenth gear: Close clutches CL2, side 1510 of full synchronizer clutch 1510/1512, and side 1514 of full synchronizer clutch 1514/1516; and open clutch CL1.

11. Reverse first gear: close clutches CL1, 1546, and 1540 and open clutch CL2.

12. Reverse second gear: close clutches CL2, 1544, and 540 and open clutch CL1.

Advantageously, the transmissions described in the figures provide gear multiplication without the need for torque filling. That is, the transmissions described in the figures provide a same number of speed ratios as prior art transmissions using fewer components such as gears, lay shafts, and synchronizer clutches. For example, a same gear 124 is used for more than one forward speed ratio. Using FIG. 5 as an example, transmission 501 is arranged to provide ten forward speed ratios. Half synchronizer clutch synchronizer 402 non-rotatably connects gear 124F to lay shaft 118 for both the first and second speed ratios. In like manner, half synchronizer clutch synchronizer 406 non-rotatably connects gear 124H to lay shaft 134 for both the third and fourth speed ratios. Advantageously, reducing the number of components reduces cost, complexity, weight, and size of the transmissions described in the figures.

In general, the number of speed ratios provided by a particular transmission described in the figures can be found by the following formulas:

Total number of speed ratios(forward and reverse)= (number of input shafts)×(number of gears that can be non-rotatably connected to the output shaft)×(the number of lay shafts).     1.

The number of reverse speed ratios=(number of input shafts)×(number of lay shafts used to transmit torque for the reverse speed ratios)× (number of gears non-rotatably connected to the lays shafts to transmit torque for the reverse speed ratios).     2.

The number of forward speed ratios=(number of total speed ratios)−(number of to reverse speed ratios).     3.

Returning to FIG. 5 as an example:

Total number of speed ratios=(2 [input shafts 112 and 114])×(2 [gears 132 and 418])×(3 [lay shafts 118, 134, and 502])=12.     1.

Number of reverse speed ratios=(2)×(1 [lay shaft 502])×(1 [gear 124*M*])=2.     2.

Number forward speed ratios=12−2=10.     3.

As described in the figures, a respective plurality of forward speed ratios in a sequence is provided by each of the transmission described in the figures. For each speed ratio in a respective sequence, a respective torque path is formed from one of input shafts 112 or 114 to output shaft 116 through one of the lay shafts in each transmission. Using FIG. 5 as an example, for each of the ten forward speed ratios, a respective torque path is formed from input 112 or 114 to output 116 via one of lay shafts 118, 134, or 502. For every respective speed ratio in the sequence immediately preceding or immediately following each speed ratio in the sequence, the respective torque path is through a lay shaft other than the lay shaft used for the respective speed ratio.

Using FIG. 5 as an example, for the third speed ratio, a torque path is formed from input shaft 112 to output shaft 116 through half synchronizer clutch synchronizer clutches 306 and 406, gears 124E and 124H and lay shaft 134. For the second speed ratio, a torque path is formed from input shaft 114 to output shaft 116 through half synchronizer clutch synchronizer clutches 122 and 402, gears 124B and 124F and lay shaft 118. For the fourth speed ratio, a torque path is formed from input shaft 114 to output shaft 116 through half synchronizer clutch synchronizer clutches 304 and 406, gears 124D and 124H and lay shaft 134. Thus, for each successive speed ratio shift, torque is transmitted via a different lay shaft. Thus, there is no torque interruption as described above and no need for torque filling.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A transmission, comprising:
first and second input shafts;
an output shaft;
first, second, and third lay shafts;
a first gear non-rotatably connected to the second lay shaft and a second gear non-rotatably connected to the second input shaft, respectively;
third and fourth gears meshed with the first and second gears, respectively, so that rotation of the first and second gears causes rotation of the third and fourth gears, respectively;

a first full synchronizer clutch including:
  a first half synchronizer clutch arranged to non-rotatably connect the third gear to the first lay shaft and to disconnect the third gear from the first lay shaft; and,
  a second half synchronizer clutch arranged to non-rotatably connect the fourth gear to the first lay shaft and to disconnect the fourth gear from the first lay shaft; and,
a synchronizer engaged with the first full synchronizer clutch, wherein for a first speed ratio for the transmission, the synchronizer is arranged to non-rotatably connect the third and fourth gears to create a first torque path from the first input shaft to the second lay shaft.

2. The transmission of claim 1, wherein the first torque path by-passes the first lay shaft.

3. The transmission of claim 1, further comprising:
a first half synchronizer clutch synchronizer clutch engaged with the first input shaft and the second lay shaft; and,
a second half synchronizer clutch synchronizer clutch engaged with the second lay shaft and the output shaft, wherein:
  for a second speed ratio for the transmission:
    the first half synchronizer clutch synchronizer clutch is arranged to non-rotatably connect the first input shaft and the second lay shaft; or,
    the second half synchronizer clutch synchronizer clutch is arranged to non-rotatably connect the second lay shaft and the output shaft; or,
    the first half synchronizer clutch synchronizer clutch is arranged to non-rotatably connect the first input shaft and the second lay shaft, and the second half synchronizer clutch synchronizer clutch is arranged to non-rotatably connect the second lay shaft and the output shaft.

4. The transmission of claim 1, further comprising:
a first half synchronizer clutch synchronizer clutch engaged with the second lay shaft and the output shaft, wherein:
  for the first speed ratio the first half synchronizer clutch synchronizer clutch is arranged to non-rotatably connect the second lay shaft and the output shaft.

5. The transmission of claim 1, wherein:
the transmission is arranged to provide a sequence of forward speed ratios;
for each speed ratio in the sequence a respective torque path is formed from one of the first or second input shafts to the output shaft through one of the first, second, or third lay shafts; and,
for every respective speed ratio in the sequence immediately preceding or immediately following said each speed ratio in the sequence, the respective torque path is formed from one of the first or second input shaft to the output shaft through another of the first, second, or third lay shafts.

6. The transmission of claim 1, wherein the transmission:
includes no more than three lay shafts;
includes no more than twelve torque-transmitting gears; and,
is arranged to provide ten forward speed ratios and two reverse speed ratio.

7. The transmission of claim 1, further comprising:
fifth and sixth gears, each of the fifth and sixth gears non-rotatably connected to one of:
  the first or second input shaft; or,
  the second lay shaft; or,
  the output shaft;
seventh and eighth gears meshed with the fifth and sixth gears, respectively, so that rotation of the fifth and sixth gears causes rotation of the seventh and eighth gears; and,
a second full synchronizer clutch including:
  a first half synchronizer clutch arranged to non-rotatably connect the seventh gear to the one of the first or third lay shafts; and,
  a second half synchronizer clutch arranged to non-rotatably connect the eighth gear to the one of the first or third lay shafts, wherein:
    the transmission is arranged to provide a plurality of forward speed ratios; and,
    for each of second and third speed ratios included in the plurality of forward speed ratios, the first half synchronizer clutch is arranged to non-rotatably connect the seventh gear to the one of the first or third input shaft.

* * * * *